Nov. 14, 1967  EDUARDO MAASS ESCOTO  3,352,596
COLLAPSIBLE SHELTERING TRAILER

Filed Oct. 24, 1965  8 Sheets-Sheet 1

United States Patent Office 3,352,596
Patented Nov. 14, 1967

3,352,596
COLLAPSIBLE SHELTERING TRAILER
Eduardo Maass Escoto, Mexico City, Mexico, assignor to Kombi Flex, S.A., a corporation of Mexico
Filed Oct. 24, 1965, Ser. No. 504,736
Claims priority, application Mexico, Nov. 14, 1964, 79,804
5 Claims. (Cl. 296—27)

ABSTRACT OF THE DISCLOSURE

A collapsible trailer having a base in the form of a box, includes a pair of shell members. Each shell member has a sidewall, front and rear walls, and a roof portion. The shell members are hinged along the side walls to opposite sides of the box and may be rotated from a closed position, in which they provide a cover for the box, to an opened position, in which the roof portions of the shell members serve as opposite sides defining a shelter. A rigid center roof section is hinged to a pair of rigid roof panels on opposite sides of the roof section. The roof panels are each hinged to the adjacent shell members. During motion of the shell members, the roof section and roof panels are elevated from an initial position enclosed within the shell members to a final position outwardly thereof to provide a roof structure over the shelter.

---

This invention relates to a sheltering trailer which can be hauled by an automobile or other motor vehicle, and which can be opened or collapsed easily.

Several types of trailer vehicles are available in the market which are commonly used for transporting baggage, boats and the like, and many of them are equipped as houses, that is provided with all the necessary conveniences for making them inhabitable, such as: beds, tables, kitchen, restroom, etc. Some trailers are of relatively small size, but these are normally used only occasionally and not as permanent houses. The trailers available in the market which are large enough to serve as a house or as a relatively permanent shelter are difficult to transport over roads and highways because of their size.

It is the primary object of the present invention to provide a collapsible trailer vehicle which is suitable to be inhabited for extended periods, which can be easily transported to remote areas and which also can be easily opened or collapsed.

The details of the invention are described in the following description and in the attached drawings, in which.

Figure 1:
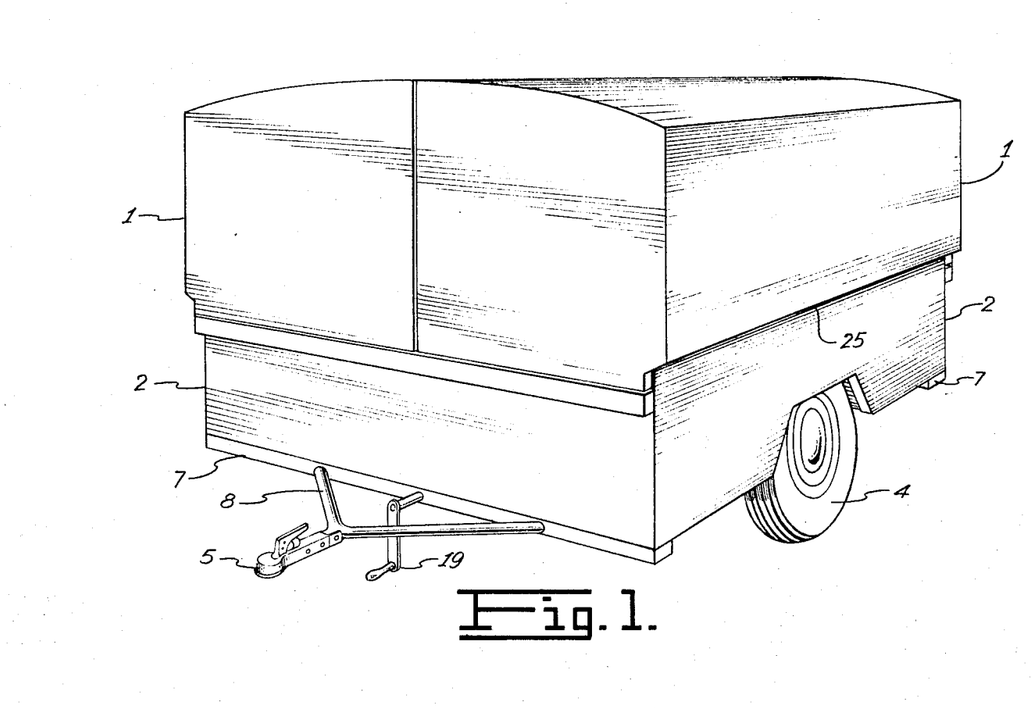
FIGURE 1 is a perspective view of the rear of the trailer of this invention in its closed or collapsed condition.
Figure 2:
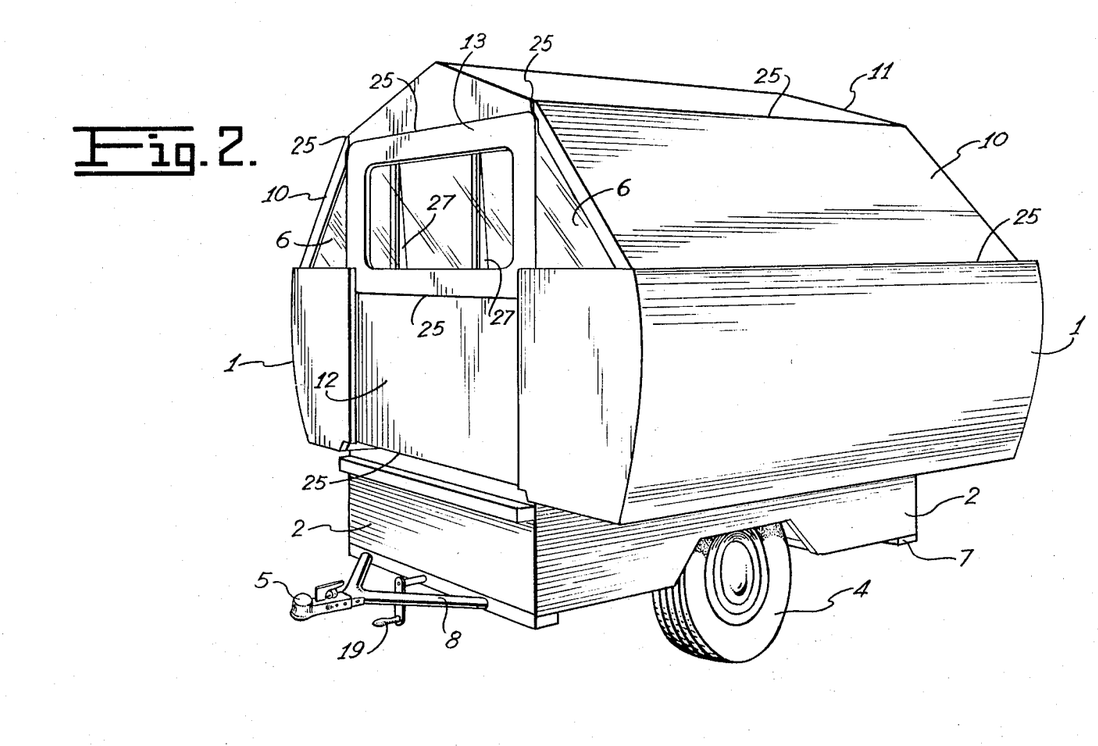
FIGURE 2 is a perspective view of the front of the trailer in its completely opened or extended condition.
Figure 3:
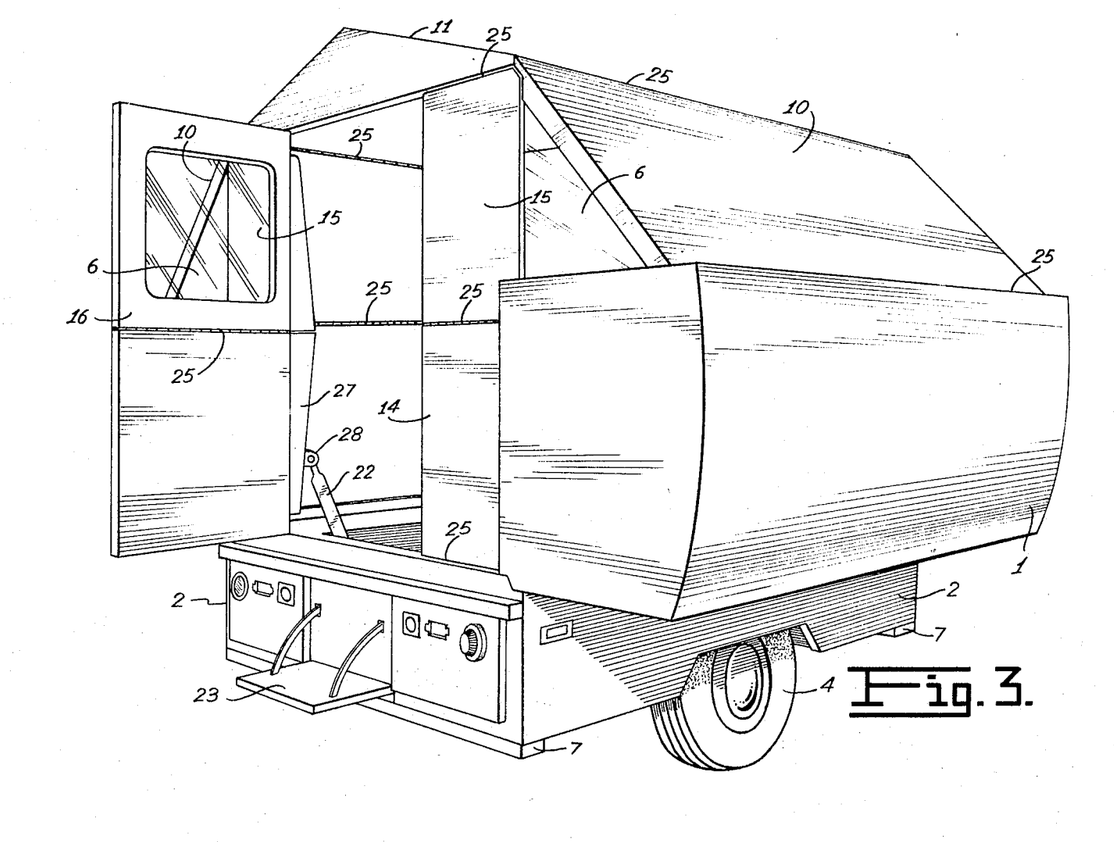
FIGURE 3 is a perspective view of the rear of the trailer and showing an open door.
Figure 4:
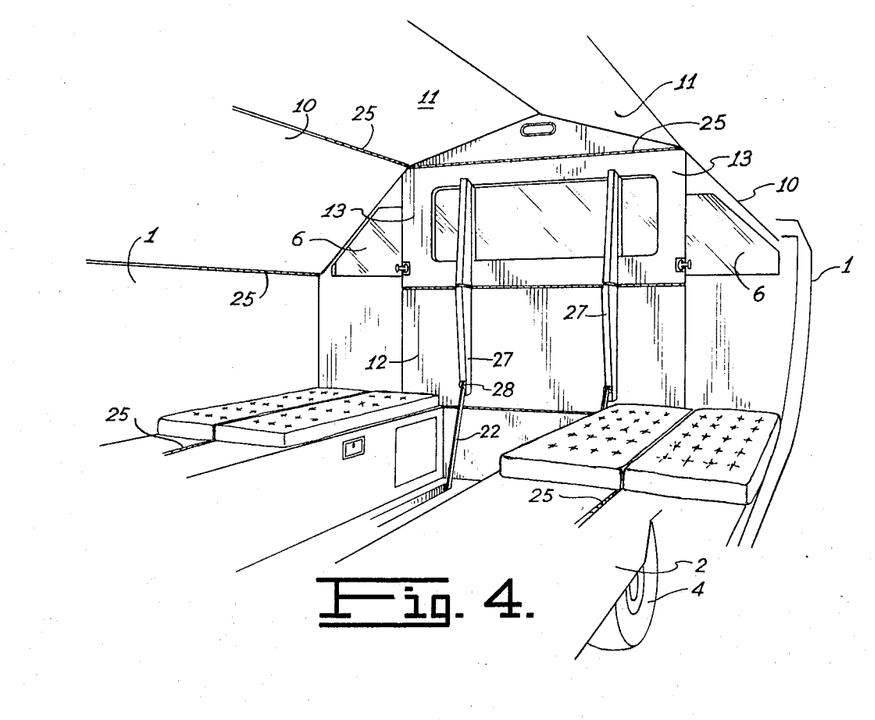
FIGURE 4 is a perspective view of the trailer showing the front of the interior.
Figure 5:
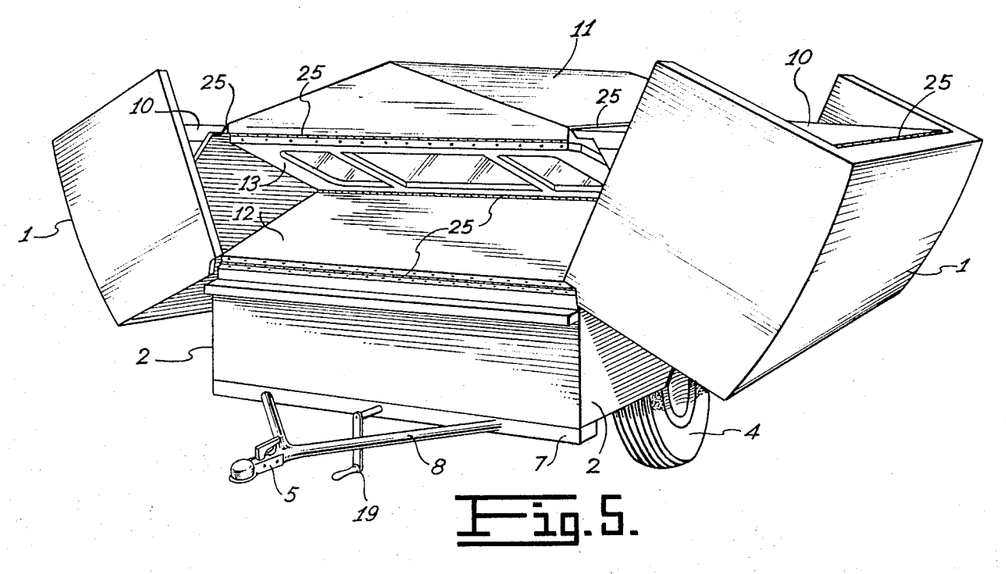
FIGURE 5 is a perspective view of the trailer in a partially collapsed condition.
Figure 6:
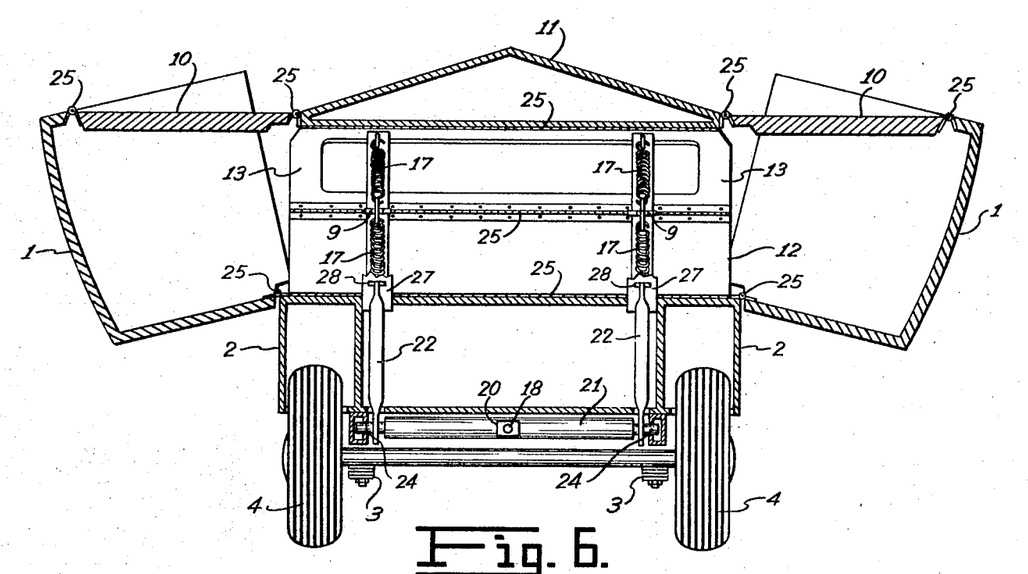
FIGURE 6 is a rear elevation view of the trailer in cross-section and showing certain inner mechanism.
Figure 7:
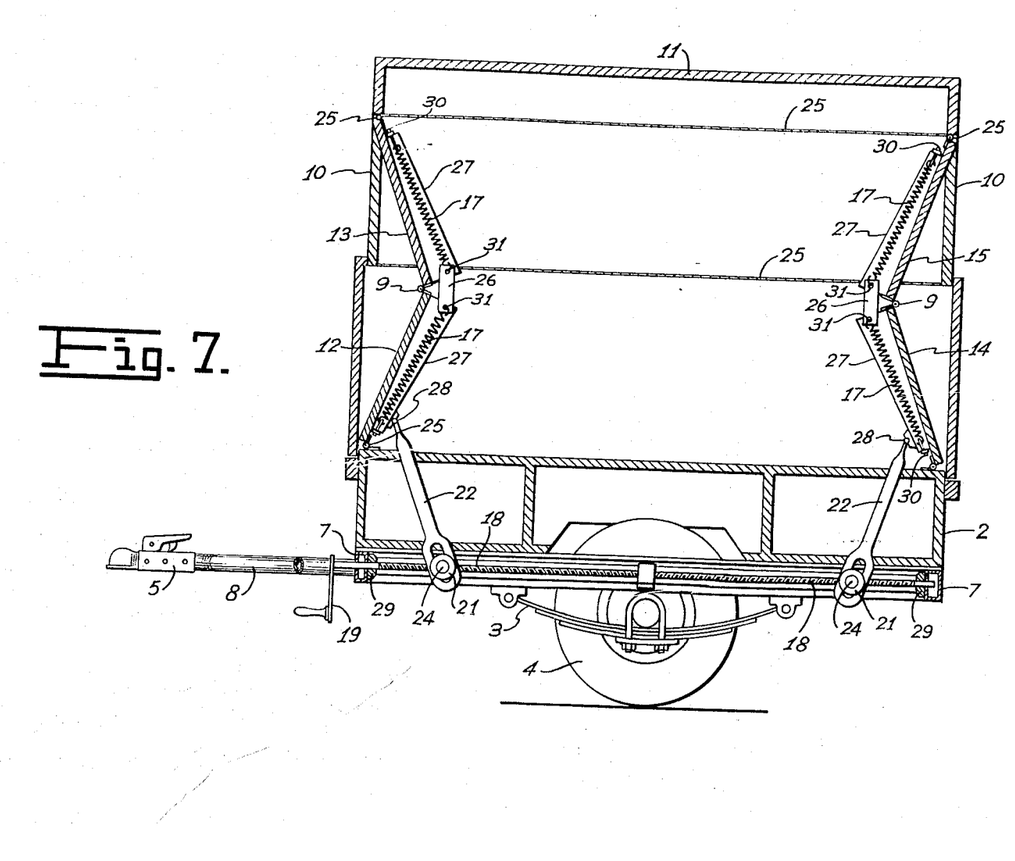
FIGURE 7 is a side elevation view of the trailer in cross-section showing certain inner mechanism.
Figure 8:
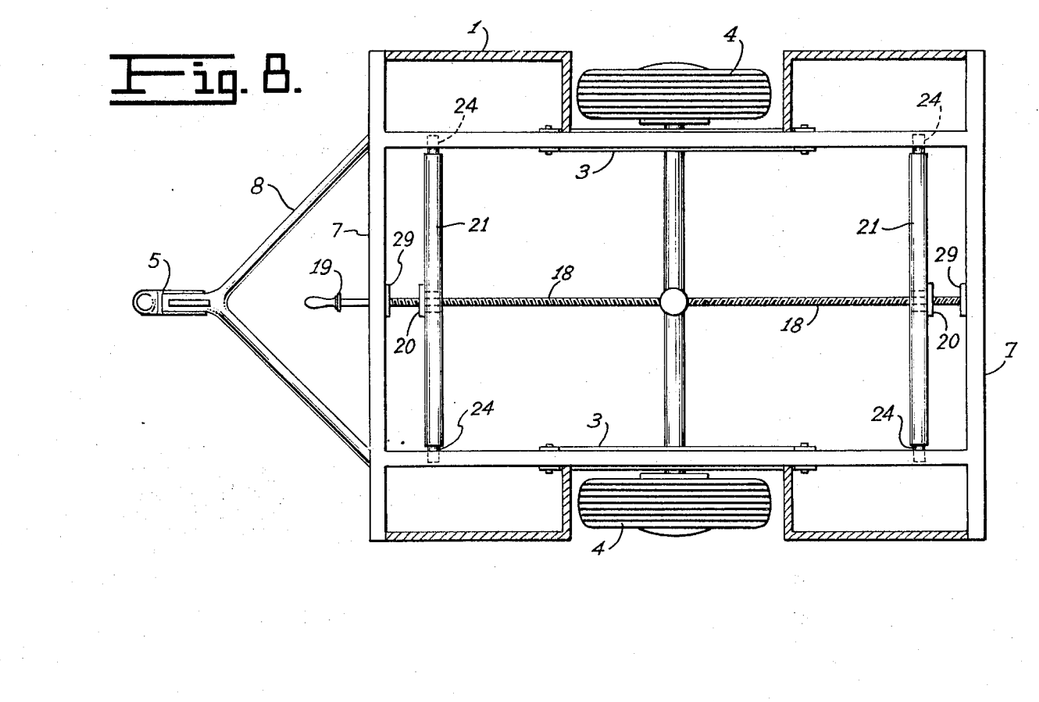
FIGURE 8 is a plan view of the trailer in cross-section.

The trailer includes a box or base 2 which is supported by a frame 7 provided with a spring suspension 3 and two wheels having pneumatic tires 4. The frame 7 is provided on the front thereof with a structural element in the form of a Y element 8, which in turn carries a connecting or attachment device 5 to a motor vehicle. Attached to frame 7 behind the Y element is a crank 19 which serves to close and extend the trailer.

At the rear of the box 2 there is a movable panel 23, accurately centered, which can be raised and lowered at will, in order to form a stairway.

Box 2 forms a welded integral unit, fabricated preferably with tubular iron members, covered in the interior with triplay or other suitable material and on the exterior with aluminum sheet or other materials. The floor of box 2 in turn forms the inner floor of the trailer.

Over the box are located two shells 1 which form side walls and which have generally rectangular front and rear walls. The upper portion of the shells 1 preferably are curved. When the trailer is to be completely extended, these shells 1 are rotated outwardly through an angle of about 90° with respect to the side walls of the box. The front and rear parts of these shells when the trailer is extended, provide the front and rear walls of the house or shelter which is formed by the trailer. The upper portion of these shells form a curved rectangular cover or roof when the trailer is closed and form the side walls of the shelter when the trailer is extended.

All of the parts forming the shelter or house are concealed within the shells 1 and over the box 2 when the trailer is closed.

The shelter or house is comprised of box 2 and the shells 1 forming, as illustrated, the walls thereof. Attached to each one of the shells on the upper portion there is a panel 10 the engagement thereof being made by means of hinges 25. The number of panels can be varied. This panel 10 is of rectangular form, and when the trailer is extended, has a slope of 45° in relation to the horizontal. These panels form the first roof elements of the shelter. The panels are in turn attached to a center roof section 11, which is a pyramidal structure and made as a single piece, although it can be built of two or more members. This pyramidal structure, when the trailer is extended, forms the top of the roof of the shelter, and provides a double slope roof structure.

Both the panels 10 and the pyramidal structure 11, when the trailer is closed, are located within the shells 1 over the box 2. In the extended condition, the shells 1 and the box 2, together with the pyramidal structure, form the shelter section of the trailer.

The trailer at its front portion includes two panels, a lower panel 12 and an upper panel 13, attached one to the other by means of hinges 25, such that they can be folded or collapsed inwardly. When the trailer is extended, these panels 12 and 13 form a rigid unit. The upper panel 13 is provided with a window 27. Instead of these panels, a door can be used in the same manner as the door at the rear portion of the shelter, as will be described.

Between the upper panel 13 and the side panels 10 there is a space assuming the form of a triangle 6 which is used as a window, and is covered with glass or other suitable material. Panels 12 and 13 are respectively joined to the floor and to the roof of the shelter by means of hinges 25.

The rear of the trailer includes four small panels having a rectangular form, that is two lower panels 14 and two upper panels 15, located adjacent each one of the sides such that they will leave a space therebetween. The panels 14 and 15 are attached one to the other by means of hinges 25, such that they can be folded inwardly, and also, by means of hinges 25 they are respectively connected to the box 2, the lower panels being hinged to the floor and the upper panels being hinged to the roof 11 of the shelter.

Within the space between the panels, there is provided a door 16 built with two panels connected by means of hinges 25. The upper panel of the door is provided with a window 6. In the extended condition of the trailer, both panels of the door become rigid one to the other because of the hinge arrangement, and in effect form a rigid door. In order to fold up the trailer, it is necessary that the door be closed.

Similarly, as at the front portion between the upper panels 15 and the side panels 10, there is a space in the form of a triangle and serving as a window 6.

At the rear of the box 2, centrally thereof, there is provided a panel 23 which can be lowered or raised at will, in order to form a stairway to allow comfortable access to the interior of the trailer.

The trailer, when extended, forms a shelter normally capable of accommodating up to four persons; however, it can be built in different sizes to accommodate different numbers of people. The trailer can be built specifically for transportation of baggage and other dead loads or for use as shops for selling goods. The building materials for the trailer can be wood, plastic, glass fiber, aluminum or any other suitable material.

Inside the trailer there is a central alley, sided by two ample seats or beds formed by the inner portion of the side panels of the shells 1. In the inner portion, closets, a table and other objects can be provided as necessary in order to provide comfort for the occupants.

In order to open and close the trailer, that is in order to collapse or extend the trailer, a mechanical system is provided to effect these actions with ease. The system includes the following elements. There are four large hinges 9, two located on the front panels 12 and 13 and two on the rear panels 14 and 15 of the trailer, on the interior thereof, each hinge 9 being provided adjacent the wall formed by the shells 1 such that the arms of the hinges are located one on the upper panels 15 and 13 and the other one of the hinges is located on the lower panels 12 and 14 with the pin of the hinge 9 located at the joint of said panels.

On each arm of the hinges 9 a tension spring 17 is provided in the following manner. At the end of each one of the arms of hinges 9 a screw 30 provided with a bore is placed, wherein one of the ends of the spring is introduced. The other end of the spring is introduced into an eye 31 or into bores provided at the center of the hinge 9, which is built in the form of a splinter 26 and is located on the pin of the hinge 9 proper. The springs are placed such that they will run on the arms of the hinge, which are fixed one to the upper panel and the other to the lower panel.

The springs are covered with a metallic sheath 27 which is attached by means of screws or otherwise to the arms of the hinge, such that the entire structure in turn may be attached to the panels.

On each one of the sheaths 27 covering the lower springs 17 there is a joining element 28 comprising a welded web carrying a pin to which a rigid cylindrical arm 22 is engaged, said arm being provided at its lower end with a needle eye.

The needle eyes of the four rigid arms 22 are engaged to four rolls 24 which are located such that on their outer end they are slidably mounted on a channel built on the inner portion of frame 7, so that they can run freely therealong. The rolls 24, by pairs, are mounted on two tubes 21 which join them in the manner of an axle.

A nut 20 is attached to each tube 21, intermediate its ends and through the inner portion thereof. Through said nuts an endless, rotatable screw 18 passes, and this endless screw at the rear portion of the vehicle is rotatably secured to a bushing 29 and at the front end of the vehicle passes through another bushing 29, thus leaving a free end to which a crank 19 is attached.

To extend the trailer, the shells 1 are opened by hand with the crank 19 which is rotated clockwisely, thereby imparting a rotational movement to the endless screw 18 which in turn is converted into longitudinal movement by means of the nuts 20 located at the inner portion of the tubes 21 carrying the rolls 24 which support the rigid arms 22. This longitudinal movement displaces the rigid arms 22 toward the ends of the vehicle and in turn they push the panels 12, 13, 14 and 15 outwardly, so that by means of the action of the hinges 9 and the springs 17, the panels 12, 13, 14 and 15 assume a vertical position, completely extending the trailer after the panels rotate about 90°. When the panels reach this position, the parts forming the roof 10 and 11, in turn, assume an angle of 45°. Once opened the panels remain in rigid position without any possibility of closing again until desired, due to the holding action of the springs.

In order to close or collapse the shelter, the crank 19 is actuated counterclockwisely, until the upper portion of the roof 11 and the panels 10 and the front and rear panels 12, 13, 14 and 15 reach a position where they are nested within the shells which in turn are closed by hand.

I claim:

1. A collapsible trailer providing a shelter portion when opened, said trailer comprising a box serving as a base for the trailer and having a floor; a pair of shell members each having a side wall, front and rear walls and a roof portion; the side wall of each shell member being hinged to opposite sides of the box and rotatable with respect thereto to a closed position to provide a cover for the box or to an opened position wherein the roof portions of the shell members serve as opposite sides of the shelter portion; a rigid center roof section; and a pair of rigid roof panels each hinged to opposite sides respectively of the center roof section and to an adjacent one of said shell members and elevating means connected at one end thereof to said box and operatively connected with said roof section for elevating said roof section and said roof panels from an initial position enclosed within said shell members to a final position disposed outwardly thereof during rotation of said shell members from said closed position to said opened position thereof to provide a roof structure over the shelter portion when the shell members are rotated to the opened position.

2. A collapsible trailer as defined in claim 1 further comprising an end wall of two separate upper panels and two separate lower panels, the upper panels being hinged to the center roof section and the lower panels being hinged to the box, and each upper panel being hinged to the corresponding lower panel whereupon rotation of said shell members from the opened to the closed position, each upper panel collapses upon the corresponding lower panel beneath the center roof section.

3. A collapsible trailer as defined in claim 2 wherein the end wall includes a door comprising an upper and lower section, the upper door section being hinged to one of the upper panels and the lower door section being hinged to the corresponding lower panel, and the upper and lower door sections being hinged together.

4. A collapsible trailer as defined in claim 2 having two such opposed end walls, said elevating means including a rotatable screw means extending between the end walls, arm means mounted on the screw means at each end thereof and movable longitudinally toward or away from the end walls depending upon the direction of rotational movement of the screw means, said arm means being operatively connected to the panels of respective end walls to impart said longitudinal movement to the panels, and means for rotating said screw means in one rotational direction to move said arm means longitudinally away from the end walls thereby moving the panels from an opened to a collapsed position.

5. A collapsible trailer as defined in claim 4 further including spring means operatively connected across the hinge connection between corresponding upper and lower panels whereupon movement of the panels to a collapsed position places the spring means in tension and movement of the panels to an opened position relieves the tension in the spring means so that the force of the spring means will assist in moving the panels to an opened position and serve to hold the panels in an opened position.

References Cited

UNITED STATES PATENTS

| 1,864,047 | 6/1932 | Lawhorne | 296—23.6 |
| 3,145,044 | 8/1964 | Harrison | 296—23 |

FOREIGN PATENTS

| 1,070,557 | 2/1954 | France. |
| 210,548 | 7/1940 | Switzerland. |

LEO FRIAGLIA, *Primary Examiner.*

P. GOODMAN, *Assistant Examiner.*